(12) United States Patent  (10) Patent No.: US 7,232,189 B2
Covington et al. (45) Date of Patent: Jun. 19, 2007

(54) WASTE CONCRETE DISPOSAL BOX

(75) Inventors: Lester B. Covington, Quinlan, TX (US); Phillip R. Fletcher, Dallas, TX (US); Gerald T. Kitchingham, McKinney, TX (US)

(73) Assignee: Southern Star Concrete, Inc., Irving, TX (US)

( * ) Notice: Subject to any disclaimer, the term of this patent is extended or adjusted under 35 U.S.C. 154(b) by 451 days.

(21) Appl. No.: 10/818,170

(22) Filed: Apr. 5, 2004

(65) Prior Publication Data

US 2005/0220589 A1 Oct. 6, 2005

(51) Int. Cl.
*B60P 1/00* (2006.01)

(52) U.S. Cl. .................... 298/1 B; 298/17 R; 298/17.5; 298/19 R; 414/467; 414/491; 414/537; 220/1.5; 220/23.87

(58) Field of Classification Search ........... 414/331.08, 414/331.16, 350, 416.04, 416.09, 419, 425, 414/446, 469, 471, 472, 491, 492, 498, 499, 414/509, 519; 298/17 R, 17.5, 19 R, 1 B; 220/1.5, 6, 23.87, 23.89, DIG. 24
See application file for complete search history.

(56) References Cited

U.S. PATENT DOCUMENTS

| 1,627,336 | A |   | 5/1927  | Nelson |
|-----------|---|---|---------|--------|
| 4,111,485 | A | * | 9/1978  | Martin et al. ................ 298/1 B |
| 4,144,979 | A |   | 3/1979  | Leach, Jr. et al. |
| 4,494,903 | A |   | 1/1985  | Badicel et al. |
| 4,705,446 | A |   | 11/1987 | Miller |
| 5,090,773 | A |   | 2/1992  | Guillaume |
| 5,145,310 | A |   | 9/1992  | Calzone |
| 5,156,518 | A | * | 10/1992 | VanMatre ................... 414/527 |
| 5,387,736 | A |   | 2/1995  | Salomone et al. |
| 5,460,431 | A |   | 10/1995 | McWilliams |
| 5,660,446 | A | * | 8/1997  | Weatherly ................... 298/8 R |
| 5,685,978 | A |   | 11/1997 | Petrick et al. |
| 5,695,280 | A |   | 12/1997 | Baker et al. |
| 5,964,566 | A |   | 10/1999 | Stewart et al. |
| 6,039,468 | A |   | 3/2000  | Kowalcyzk |
| 6,152,672 | A |   | 11/2000 | Alson |
| 6,206,476 | B1|   | 3/2001  | Welton |
| 6,283,909 | B1|   | 9/2001  | Sharp |
| 6,296,132 | B1| * | 10/2001 | Pickler ........................ 220/1.5 |
| 6,461,098 | B1|   | 10/2002 | Elefsrud |
| 6,634,848 | B2|   | 10/2003 | Henderson |
| 2002/0092799 | A1 |  | 7/2002  | Storruste |
| 2002/0098071 | A1 |  | 7/2002  | Henderson |
| 2003/0205257 | A1 |  | 11/2003 | Gross |
| 2004/0074903 | A1 |  | 4/2004  | Klempner |
| 2004/0155126 | A1 |  | 8/2004  | Jenkins |
| 2005/0031437 | A1| * | 2/2005  | Doose ........................ 414/467 |

* cited by examiner

*Primary Examiner*—Patrick Mackey
*Assistant Examiner*—Michael Lowe
(74) *Attorney, Agent, or Firm*—Vinson & Elkins LLP

(57) ABSTRACT

A container for disposing of waste concrete provides a pivoting front wall assembly such that lifting the container by the front wall assembly breaks the bond between hardened concrete and the container facilitating removal of the waste concrete.

9 Claims, 5 Drawing Sheets

WASTE CONCRETE DISPOSAL BOX

SUMMARY

In certain embodiments, the present disclosure includes a container for holding and disposing of waste concrete. It is often the case that when pouring concrete from a large concrete truck that some of the unused concrete is left in the mixer and must be removed before it hardens. In addition, when the large mixers are washed, the waste that washes out must be disposed of. Containers disclosed herein provide a means of addressing these and other problems. Waste concrete may be added or washed into the containers as a slurry and allowed to harden or set in the container. When the container is full, it may be loaded onto a dump truck and hauled to an appropriate location to be dumped and disposed of. Preferred embodiments of the disclosed containers provide a front wall that is moveable with respect to the side walls and floor such that the front wall tilts and moves back when the container is lifted and dumped. This force caused by the moving front wall breaks the bond between the metal of the container and the concrete and pushed the concrete toward the rear of the container.

Throughout this disclosure, unless the context dictates otherwise, the word "comprise" or variations such as "comprises" or "comprising," is understood to mean "includes, but is not limited to" such that other elements that are not explicitly mentioned may also be included. Further, unless the context dictates otherwise, use of the term "a" may mean a singular object or element, or it may mean a plurality, or one or more of such objects or elements.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
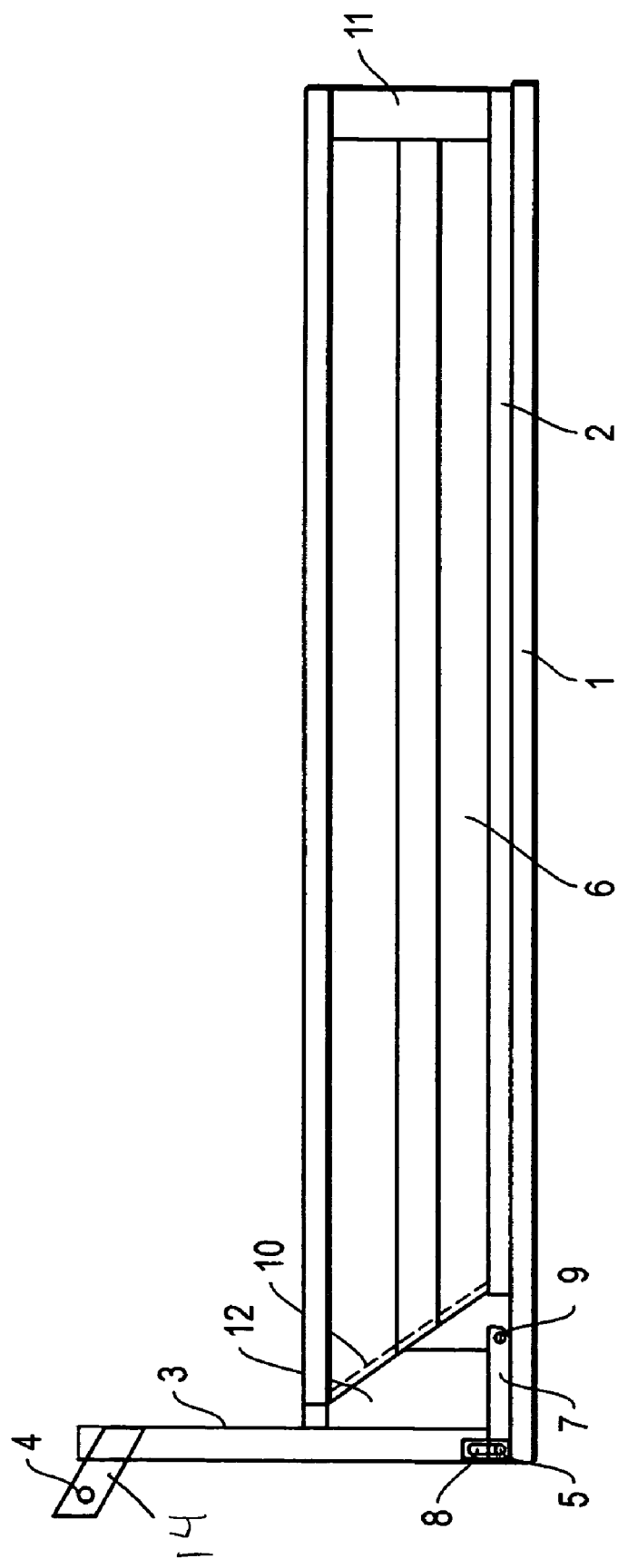
FIG. 1 is a side plan view of an embodiment of a container.

FIG. 1 is a side plan view of a container as described herein. The container or box includes slide rails 1, an undercarriage 2, side walls 6, a floor, a rear wall 11 and a front wall 10 that is moveable with respect to the side walls and floor. In preferred embodiments, the container is built to be able to contain up to 10 cubic yards of concrete with a density no greater than 145 pounds per cubic foot. The undercarriage then comprises the structural framework necessary to support the loaded weight of the box and to provide a platform for the floor of the container. The floor preferably comprises a sheet of ¼" steel. The undercarriage also preferably comprises two or more slide rails 1 and a roller assembly 15 for unloading the contents of the container.

Figure 2:
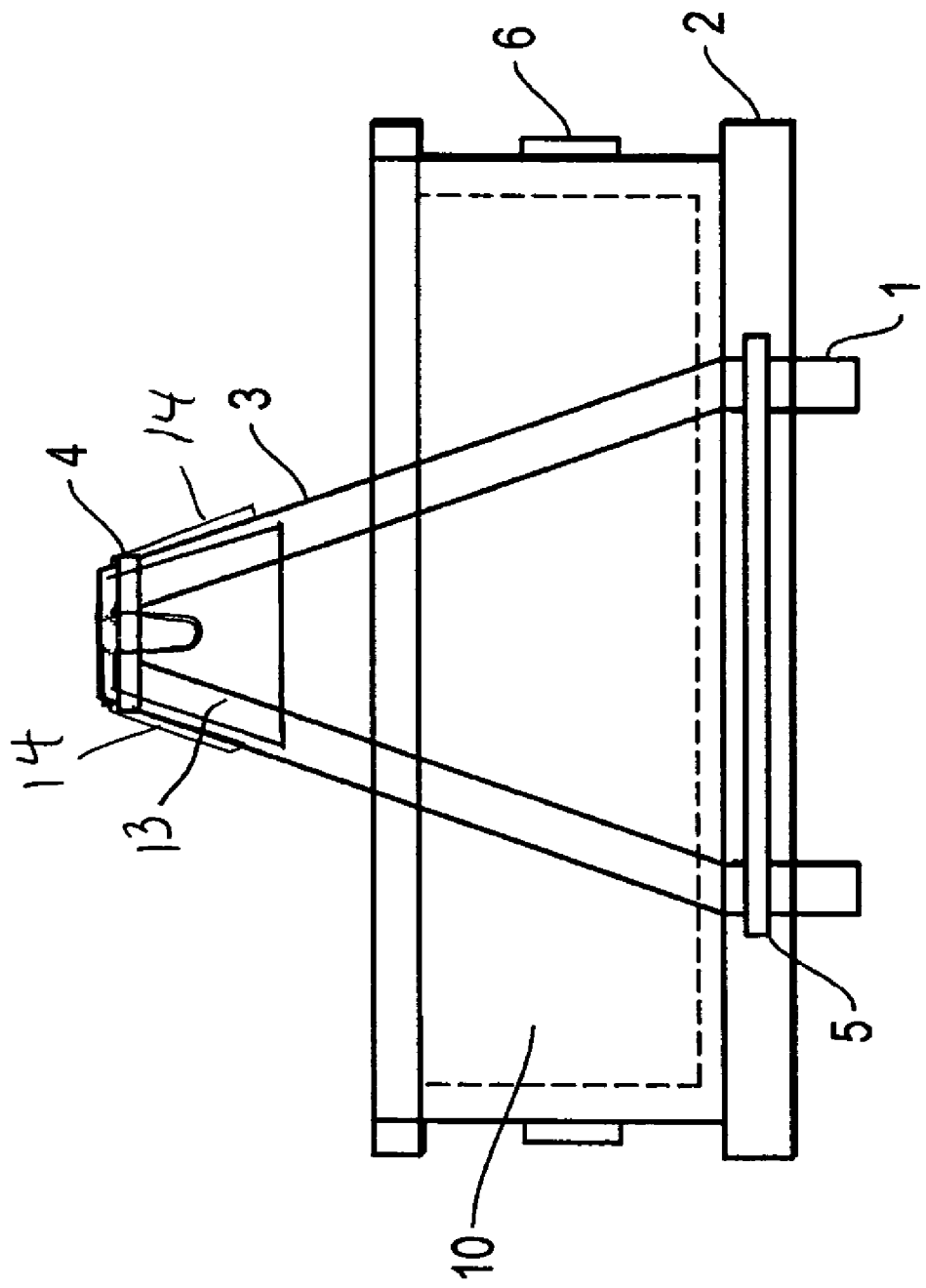
FIG. 2 is a front plan view of an embodiment of a container.

The A-frame assembly can also be seen from the front perspective in FIG. 2. The front wall or forward bulkhead assembly includes an A-frame structure for attachment of the container to the lift mechanism of the truck. The A-frame includes two opposing substantially horizontal members 7 that are parallel to the long axis of the container and lie along the top of the undercarriage 2, one near each side wall. The horizontal members are attached at their aft ends (toward the rear wall) to the undercarriage by a pivot shaft 9, which may comprise a shaft held within a pad eye such that the shaft is able to rotate within the pad eye. The horizontal members are attached to the undercarriage at their forward ends (toward the cab) by a shaft 5 and rotation retainer 8 such that the forward end of the horizontal members can move up or down in the rotation retainer 8 as the rear ends of the horizontal members pivot around the pivot shaft 9. This pivoting motion forces the front wall back with respect to the side walls and floor. In certain embodiments, the front wall 10 may be substantially perpendicular to the floor, or it may form an obtuse angle with the floor, in some embodiments, the front wall 10 may form an angle of about 135° with the floor.

The A-frame structure also includes two substantially upright members or legs 3, each rigidly attached to a forward end of the respective horizontal members 7 and angled toward the midline of the container to form the apex of the "A" frame. The top of the A-frame includes an A-frame gusset 14 on either side of the Apex. A shaft 4 provides a common lifting point for attachment to the lift arm of a truck, and is held in the A-frame gussets 14 to provide the hook point for lifting and dumping the container. The A-frame also comprises a hook gusset 13. The upright members are also rigidly attached to the front wall or bulkhead, in certain embodiments by one or more plate gussets 12.

Figure 3:
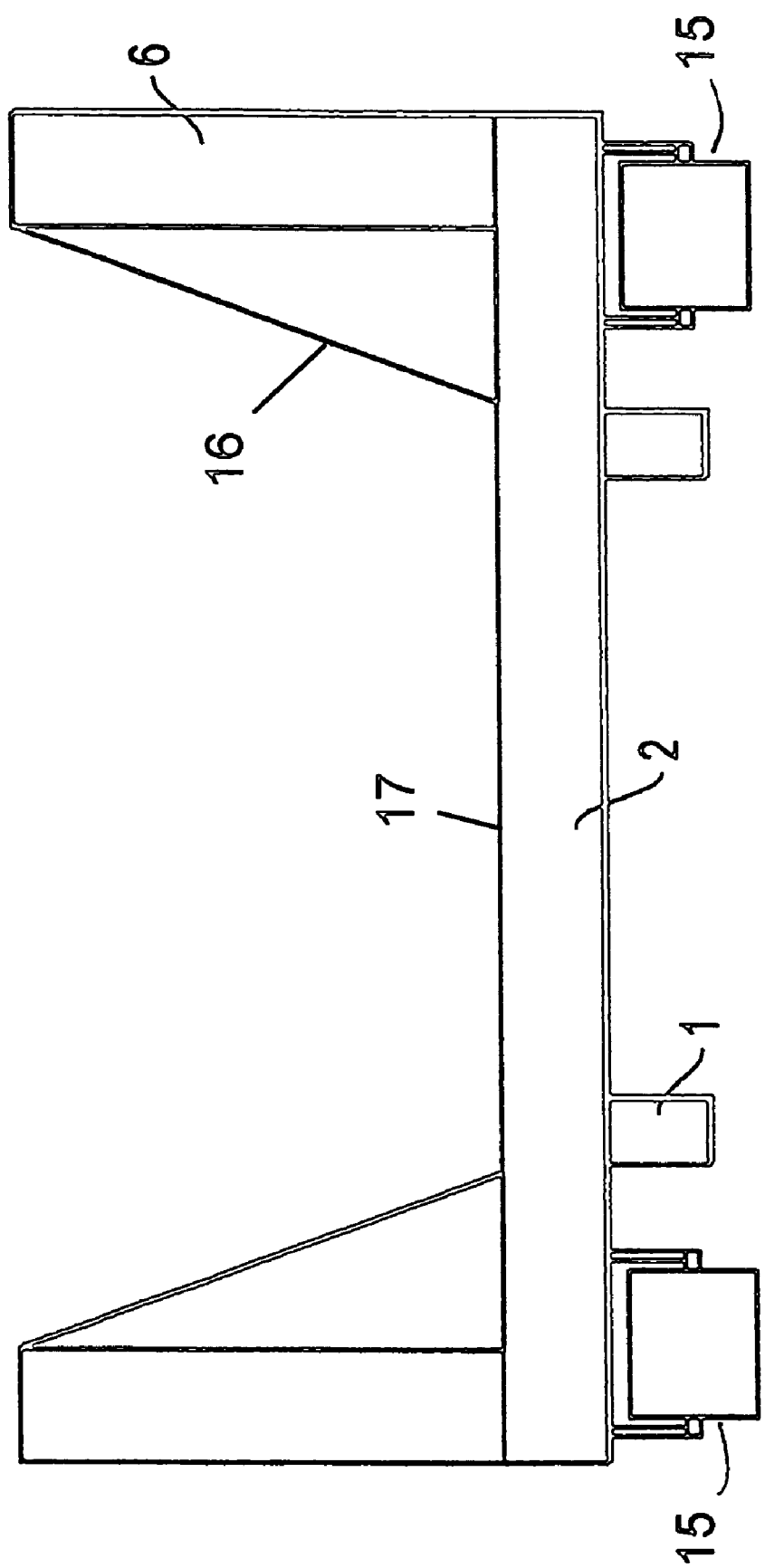
FIG. 3 is a rear plan view of an embodiment of a container.

FIG. 3 is a rear plan view of an embodiment in which the tail gate is not shown. The tail gate is necessary to hold in the slurry and is opened prior to dumping the waste concrete. Any type of tail gate known in the art may be used. As shown in FIG. 3, the interior of the side walls 16 may form an angle with the floor 17 of greater than 90° or they may be substantially perpendicular to the floor. The roller assemblies 15 may comprise rollers of 8" diameter Schedule 60 pipe on a shaft of 1.75" diameter shaft or equivalent materials.

Figure 4:
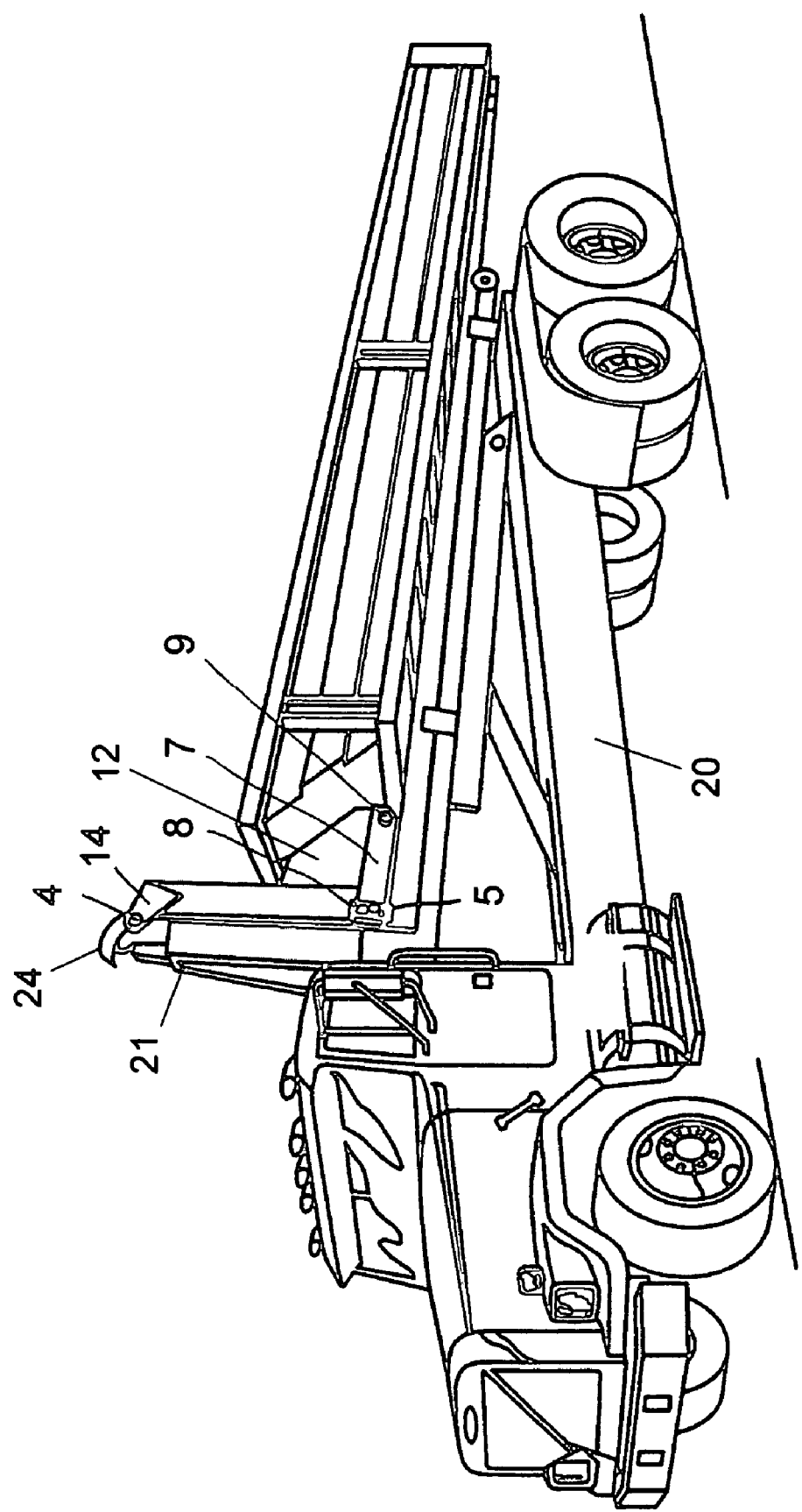
FIG. 4 is a perspective view of an embodiment of a truck.
Figure 5:
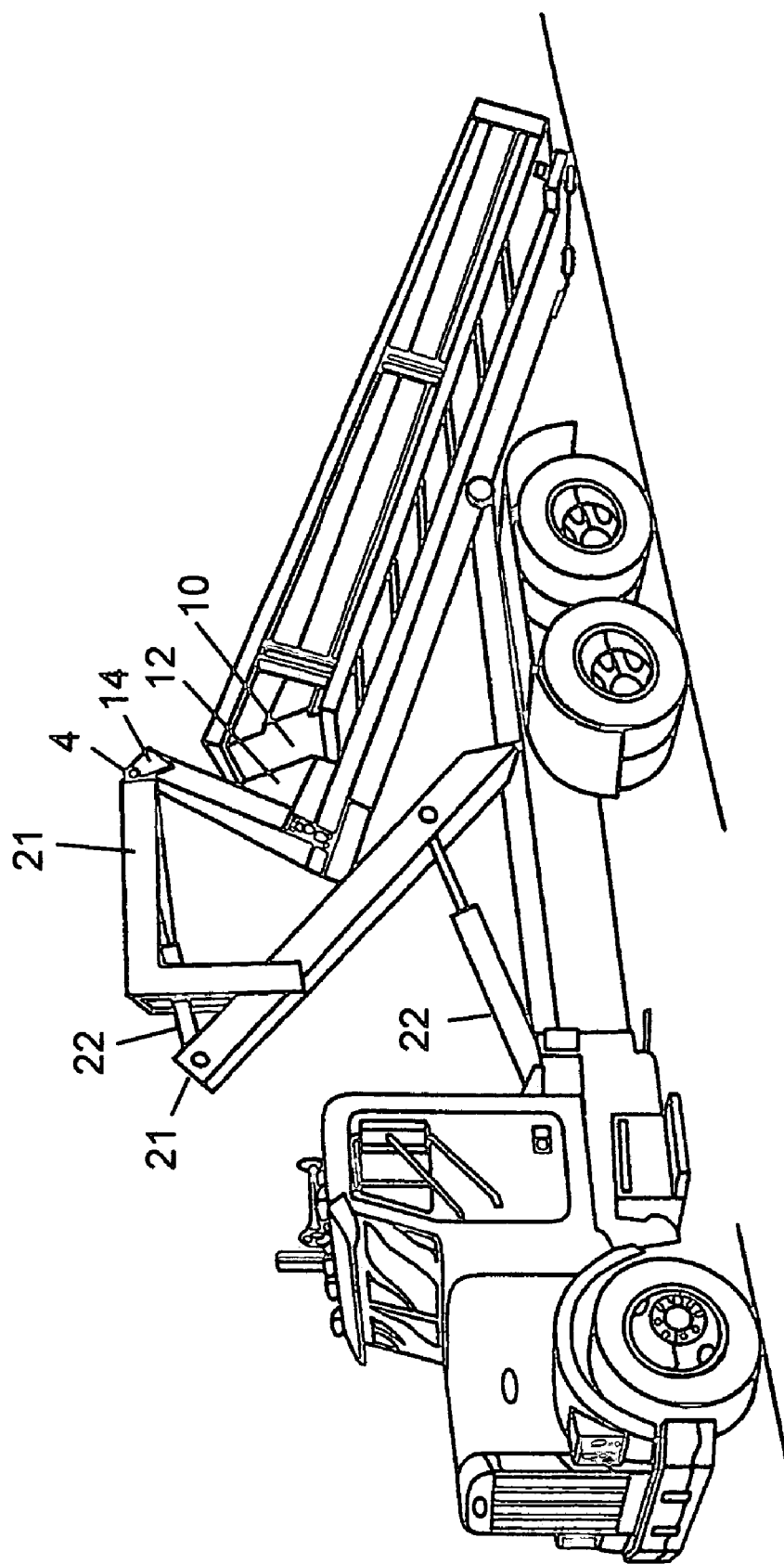
FIG. 5 is a perspective view of an embodiment of a truck.

FIG. 4 is an embodiment of a truck and container in which the container is being lifted as it would to dump waste concrete from the container. As seen in FIG. 4 the truck comprises a frame 20 and a lift mechanism 21 including one or more hydraulic cylinders 22 and a hook assembly 24 hooked to shaft 4 in order to lift the container up. As the container is lifted, the A-frame rotates about shaft 9 to the extent allowed by rotation retainer 8. The lifting force and pivoting of the A-frame causes the front wall 10 to pivot toward the rear breaking the bond between the hardened concrete and the metal of the walls and floor of the container. FIG. 5 illustrates and embodiment of a truck comprising a waste concrete container in which the waste concrete is being dumped from the container. After the container has been lifted, a second hydraulic telescoping cylinder moves the container back on the roller assemblies to dump the concrete.

All of the apparatus and methods disclosed and claimed herein can be made and executed without undue experimentation in light of the present disclosure. While the apparatus and methods of this invention have been described in terms of preferred embodiments, it will be apparent to those of skill in the art that variations may be applied to the apparatus and/or methods and in the steps or in the sequence of steps of the methods described herein without departing from the concept, spirit and scope of the invention. All such similar substitutes and modifications apparent to those skilled in the art are deemed to be within the spirit, scope and concept of the invention as defined by the appended claims.

The invention claimed is:

1. A container for disposition of waste concrete comprising:
   an undercarriage configured to mount on the frame of a roller dump truck;
   a floor attached to the undercarriage;
   opposing side walls attached to the floor;
   a back wall; and
   a front wall assembly that provides a lifting point for the container;
   wherein the front wall assembly comprises an A-frame structure comprising:
   (a) opposing substantially horizontal members attached at their aft ends to the undercarriage by a rotatable shaft, and attached to the undercarriage at their forward ends by a shaft and rotation retainer such that the horizontal members are pivotable with respect to the undercarriage; and
   (b) two substantially upright members each rigidly attached to a forward end of the horizontal members and angled toward the midline of the container to be attachable to a common lifting point in an A-frame configuration, and wherein the upright members are rigidly attached to the front wall such that rotation of the A-frame assembly moves the front wall back with respect to the floor and side walls; and
   wherein the front wall assembly is moveable toward the back wall with respect to the side walls and floor effective to break a bond between hardened concrete in the container and the walls of the container when a lifting force is applied to the front wall assembly lifting point during use.

2. The container of claim 1, wherein the front wall forms an obtuse angle with the floor.

3. The container of claim 1, wherein the front wall forms an angle of about 135° with the floor.

4. The container of claim 1, wherein the side walls are substantially vertical.

5. The container of claim 1, wherein the side walls comprise interior walls, and wherein the interior walls are angled such that the separation width of the interior side walls is greater at the top than at the bottom of the interior side walls.

6. The container of claim 1, wherein each interior side wall is angled from the floor at an angle of about 110°.

7. A truck and container for transporting and dumping waste concrete comprising:
   a frame attached to the cab;
   a lift mechanism comprising one or more hydraulic cylinders configured to apply a lifting force to a hook assembly proximal the cab and further configured to move the hook assembly toward the rear of the frame;
   rollers disposed at the rear of the frame; and
   a container for disposition of waste concrete comprising:
   (a) an undercarriage configured to roll off the rear of the truck frame for unloading;
   (b) a floor attached to the undercarriage;
   (c) opposing side walls attached to the floor;
   (d) a back wall comprising a tail gate; and
   (e) a front wall assembly rotatably attached to the container and providing a lift point for the container configured such that when the container is lifted by the lift point, the front wall assembly rotates toward the rear of the container effective to break a bond between concrete hardened in the container and the container walls.

8. The truck and container of claim 7, wherein the front wall assembly comprises an A-frame structure wherein the apex of the A frame provides the lift point for the container and wherein the legs of the A frame are rotatably attached to the container.

9. A method of disposing of waste concrete comprising:
   adding one or more portions of waste concrete in slurry form to a container and allowing the concrete portions to harden independently in the container until the container is substantially full of hardened concrete;
   transporting the substantially full container to a disposal site by truck, wherein the truck comprises a frame and the container sits on the frame, and wherein the container comprises a front wall comprising a lift point for the container;
   opening the rear of the container;
   lifting the container by the lift point attached to the front wall, wherein lifting the container pivots the front wall, breaking the bond between the hardened concrete and the container; and
   moving the lifted container toward the rear of the truck effective to dump the hardened concrete at the disposal site.

* * * * *